United States Patent
Kang et al.

(10) Patent No.: US 12,021,438 B2
(45) Date of Patent: Jun. 25, 2024

(54) ROTOR-COOLING DEVICE AND ROTATING MACHINE COMPRISING SAME

(71) Applicant: LEVIATHAN DYNAMICS, La Courneuve (FR)

(72) Inventors: Karino Kang, La Courneuve (FR); Alan Chauvin, La Courneuve (GG)

(*) Notice: Subject to any disclaimer, the term of this patent is extended or adjusted under 35 U.S.C. 154(b) by 159 days.

(21) Appl. No.: 17/760,101

(22) PCT Filed: Feb. 5, 2021

(86) PCT No.: PCT/EP2021/052855
§ 371 (c)(1),
(2) Date: Aug. 4, 2022

(87) PCT Pub. No.: WO2021/156470
PCT Pub. Date: Aug. 12, 2021

(65) Prior Publication Data
US 2023/0061495 A1    Mar. 2, 2023

(30) Foreign Application Priority Data
Feb. 5, 2020  (FR) ....................... 2001131

(51) Int. Cl.
*H02K 1/32*    (2006.01)
*H02K 9/20*    (2006.01)

(52) U.S. Cl.
CPC ..................... *H02K 9/20* (2013.01)

(58) Field of Classification Search
CPC .............. H02K 1/20; H02K 1/32; H02K 9/20
See application file for complete search history.

(56) References Cited

U.S. PATENT DOCUMENTS

2010/0006262 A1    1/2010  Welch et al.

FOREIGN PATENT DOCUMENTS

| CN | 105356637 A2 | 2/2016 | |
|---|---|---|---|
| CN | 106416011 A * | 2/2017 | ............ H02K 7/003 |

(Continued)

OTHER PUBLICATIONS

ISR; European Patent Office; Netherlands; Apr. 20, 2021.

*Primary Examiner* — Ramon M Barrera
(74) *Attorney, Agent, or Firm* — Patshegen IP; Moshe Pinchas (57) ABSTRACT

The device for cooling a rotor of a rotating machine comprises:
- in a rotor assembly (31) comprising the rotor and rotating with the rotor, at least one open cavity (40) having a single opening opening out around the axis of rotation of the rotor, and
- facing the single opening in the cavity, a cooling-liquid injector (49). The single opening in the cavity (40) simultaneously forms the inlet for the cooling liquid injected by the injector (49) and the discharge for the cooling fluid leaving the cavity in the form of vapour.

In some embodiments:
- the rotor assembly (31) comprises a shaft (33) and an electric rotor (39) surrounded by an electric stator (46), the cavity (40) being formed, at least, in the shaft (33);
- the electric stator (46) is traversed, parallel to the axis of rotation of the rotor, by at least one channel (47) configured to convey at least some of the vapour obtained by evaporation of the cooling liquid in the cavity (40) of the shaft (33), and/or
- the air gap (55) between the electric rotor (39) and the electric stator (46) is configured to convey at least some of the vapour obtained by evaporation of the cooling liquid in the cavity (40) of the shaft (33).

18 Claims, 7 Drawing Sheets

(56) References Cited

FOREIGN PATENT DOCUMENTS

| | | | |
|---|---|---|---|
| JP | H10336968 | A | 12/1998 |
| JP | 2001095205 | A | 4/2001 |
| JP | 2008082623 | A | 4/2008 |
| WO | 2008045413 | A2 | 4/2008 |

* cited by examiner

ROTOR-COOLING DEVICE AND ROTATING MACHINE COMPRISING SAME

TECHNICAL FIELD OF THE INVENTION

This invention concerns a rotor-cooling device and a rotating machine comprising same. It applies, among others, to cooling the rotors of compressors, in particular refrigeration compressors used, for example, in air conditioning, deep freezing, and the distribution of chilled water.

STATE OF THE ART

For a long time, the manufacturers of refrigeration systems (air conditioning, deep freezing, water chiller) have extensively used chemical coolants in mechanical compression cycles. These fluids have a noticeable impact on the climate. The climate agreements have made it possible to progressively ban the most harmful fluids. A new regulation will soon substantially change the rules of use for these coolants. Gradually, users and manufacturers of refrigeration systems will have to turn to natural alternatives so their essential products can be marketed and used.

For refrigeration applications where the cold temperature is higher than 0° C., the use of water as coolant is the most appropriate solution:

Water is a natural, non-polluting and non-toxic fluid;

Water presents no risks of explosion or ignition;

The thermodynamic properties of water make it possible to obtain an excellent coefficient of energy performance; and Water is not subject to a regulation concerning its closed circuit handling.

Most refrigeration systems are based on the mechanical vapor compression refrigeration cycle, which is based on liquid-vapor phase changes of the working liquid. The operating temperatures of the system define the operating pressure of the machine. To be able to evaporate the water at a low temperature, the circuit needs to be under vacuum (only a few mbar in absolute pressure). But the energy density of water vapor under vacuum is much lower than conventional coolants that are generally used under vacuum, by a multiplicative factor of 200. To have a compression system at a reasonable size and cost, a compressor has to be used that can produce a very high volumetric flow rate in a compact volume while providing the compression rate required to obtain the temperature differential between the hot portion and the cold portion.

Where a high-speed centrifugal compressor with one or more compression stages is used, this compressor has a rotor that itself comprises several components, including:

An electric motor rotor designed to rotate at speeds above 50,000 rpm;

One or more dynamic compression stages; and

One or more bearings whose technology is designed to withstand the operating conditions of the application, i.e. in particular the vacuum, water vapor and rotation speed of the rotor.

The rotor undergoes heating from different sources, such as the electrical and magnetic losses of the rotor, the aerodynamic friction on the centrifugal wheels, and the losses from friction on the bearings.

The level of vacuum required in the compressor enclosure considerably limits heat transfers by convection. It is therefore necessary to find a solution for limiting the temperature of the rotor in steady state. In effect, beyond a certain temperature level the elements of the rotor can be degraded or lose energy performance. For example, the following can be cited: deterioration in the maximum breaking strength of components subjected to strong centrifugation (centrifugal wheels and electric rotor in particular), expansion of the components on the shaft that would make the assembly inoperative (unclamping), loss of performance for the electrical motor that could lead to rotor demagnetization (in the case of a permanent magnet synchronous motor), premature wear of the bearings through evaporation of the lubricant or a temperature higher than the operating limit of the materials. All these phenomena can lead to the destruction of the rotor.

DESCRIPTION OF THE INVENTION

The present invention aims to remedy all or part of these drawbacks.

To this end, according to a first aspect, this invention concerns a device for cooling a rotor of a rotating machine, which comprises:

in a rotor assembly comprising the rotor and rotating with the rotor, at least one open cavity having a single opening opening out around the axis of rotation of the rotor, and facing the single opening in the cavity, a cooling-liquid injector;

the single opening in the cavity simultaneously forming the inlet for the cooling liquid injected by the injector and the discharge for the cooling fluid leaving the cavity in the form of vapor.

In this way, the cooling liquid injected into the cavity formed around the axis of the rotor evaporates on contact with the surface of this cavity and cools the rotor. The vapor resulting from the evaporation of the cooling liquid leaves the cavity via the single opening of the cavity through which the cooling liquid was injected.

In some embodiments, the device comprises a control unit of the injector configured to control the injection of liquid by the injector as a function of the temperature of the rotor.

In this way, liquid is only injected into the cavity when the temperature of the rotor allows this liquid to be vaporized, which avoids an excess of injected liquid that could cause a spillage of the liquid outside the cavity.

In some embodiments the control unit of the injector is configured to control the injection of liquid by the injector such that the temperature of the rotor causes the evaporation of the liquid in the form of dry vapor.

Note that, in the case of an open environment, in contact with the air, the saturation vapor pressure is the partial pressure of the vapor above which molecules can no longer be formed as vapor in the air, the air is saturated. This is the maximum "dry" vapor pressure, i.e. without liquid phase.

In some embodiments, the control unit of the injector controls the injection of liquid by the injector when the temperature of the rotor is higher than a predefined limit value.

This predefined limit value is higher than or equal to the evaporation temperature of the injected liquid.

In some embodiments, the temperature of the rotor is determined by a model utilizing at least one value measured by at least one sensor amongst:

a temperature sensor for the temperature of a stator of the rotating machine;

a current sensor for the current supplied by a variator powering an electric motor setting the rotor in rotation;

a pressure sensor for the internal pressure of the rotating machine;

a temperature sensor for the temperature of a cooling liquid of the stator of the rotating machine;

a temperature sensor for the temperature of the rotor; and a speed sensor for the rotation speed of the rotor.

In some embodiments, the model utilizes a quantity of liquid injected by the injector.

In this way, the cooling of the motor by the cooling liquid is taken into account.

In some embodiments, the control unit is configured such that the quantity of liquid injected by the injector is an increasing function of the temperature of the rotor.

In some embodiments, the control unit is configured such that the quantity of liquid injected by the injector makes the sum of the quantity of heat absorbed by the heating, up to its phase change temperature, of the injected liquid and of the quantity of heat absorbed by the phase change of the injected liquid, on one side, greater than 90% of the maximum amount of heat the rotor can transmit, at the temperature of the rotor, to the liquid through the surface of the cavity, on the other side.

In this way the cooling of the rotor is optimized.

In some embodiments, the rotor assembly comprises a shaft and an electric rotor surrounded by an electric stator, the cavity being formed, at least, in the shaft.

Thanks to these provisions, the heat generated by the heating of the electric rotor and bearings (friction of ball bearings) is removed by the evaporation of the cooling liquid directly at the level of the electric rotor and bearings.

In some embodiments, the cavity formed in the shaft extends over the entire length of the electric rotor up to at least one bearing.

Thanks to these provisions, the cooling of the rotor extends beyond the single electric rotor and cools at least one bearing.

In some embodiments, the electric stator is traversed, parallel to the axis of rotation of the rotor, by at least one channel configured to convey at least some of the vapor obtained by evaporation of the cooling liquid in the cavity of the shaft.

Thanks to these provisions, the electric stator is cooled by the cooling fluid in gaseous form.

In some embodiments, the air gap between the electric rotor and the electric stator is configured to convey at least some of the vapor obtained by evaporation of the cooling liquid in the cavity of the shaft.

Thanks to these provisions, the outer portion of the electric rotor and the inner portion of the electric stator are cooled by the cooling fluid in gaseous form.

In some embodiments, the cavity is configured to hold the liquid injected by the injector. In this way, the liquid that is not vaporized cannot escape from the cavity. Note that holding the liquid can be achieved by a cavity shape having, at its only opening, a smaller cross-section than its maximum cross-section, the liquid being held by centrifugation force in the area with a cross-section greater than the cross-section of the opening, or by the effect of gravity, the opening being located on the top of the cavity.

In some embodiments, the opening of the cavity formed in the shaft is partially blocked by a restriction wherein the surface area of the cross-section at the opening of the cavity is smaller than the surface area of the cross-section inside the cavity.

This restriction, for example conical, holds the cooling liquid during the rotation of the rotor, which can be very rapid, for example 50,000 revolutions per minute.

In some embodiments, the rotor has an axis of rotation substantially vertical and the open cavity formed in the shaft is oriented upwards.

Thanks to these provisions, the cooling liquid is held by inertial force and gravity inside the cavity formed in the shaft.

In some embodiments, the cooling fluid is water.

Water offers significant advantages:

Reduction in energy bills;

Reduction in maintenance costs;

Reduction in infrastructure costs.

According to a second aspect, the present invention concerns a rotating machine comprising a compressor and a cooling device that is the subject of the invention, the cooling fluid being the same fluid as the working fluid compressed by the compressor.

Thanks to these provisions, the same fluid is handled by the circuit outside the rotating machine, and some of the components of this circuit, for example a heat exchanger, can be shared by the compressed fluid and the cooling fluid.

In some embodiments, a channel is formed in a motor casing to convey at least some of the vapor obtained by evaporation of the cooling liquid in the cavity of the shaft, and a gap is formed between the volute and the last stage of the compressor, this gap being configured to convey this portion of the vapor.

Thanks to these provisions, the working fluid conveyed by the last stage of the compressor can be cooled by the cooling fluid in gaseous form.

As the other advantages, aims and particular features of the rotating machine that is the subject of the invention are similar to those of the cooling device that is the subject of the invention, they are not repeated here.

BRIEF DESCRIPTION OF THE FIGURES

Other advantages, aims and particular features of the invention will become apparent from the non-limiting description that follows of at least one particular embodiment of the learning system and its applications that are the subjects of the present invention, with reference to drawings included in an appendix, wherein.

DESCRIPTION OF EMBODIMENTS

The present description is given in a non-limiting way, in which each characteristic of an embodiment can be combined with any other characteristic of any other embodiment in an advantageous way.

Note that the figures are not to scale.

The device described with reference to FIGS. 1 to 8 is a device for cooling, by evaporation, a high-speed compressor rotor, more specifically in a weakly conductive environment. However, the present invention applies to all rotating machines.

Figure 1:
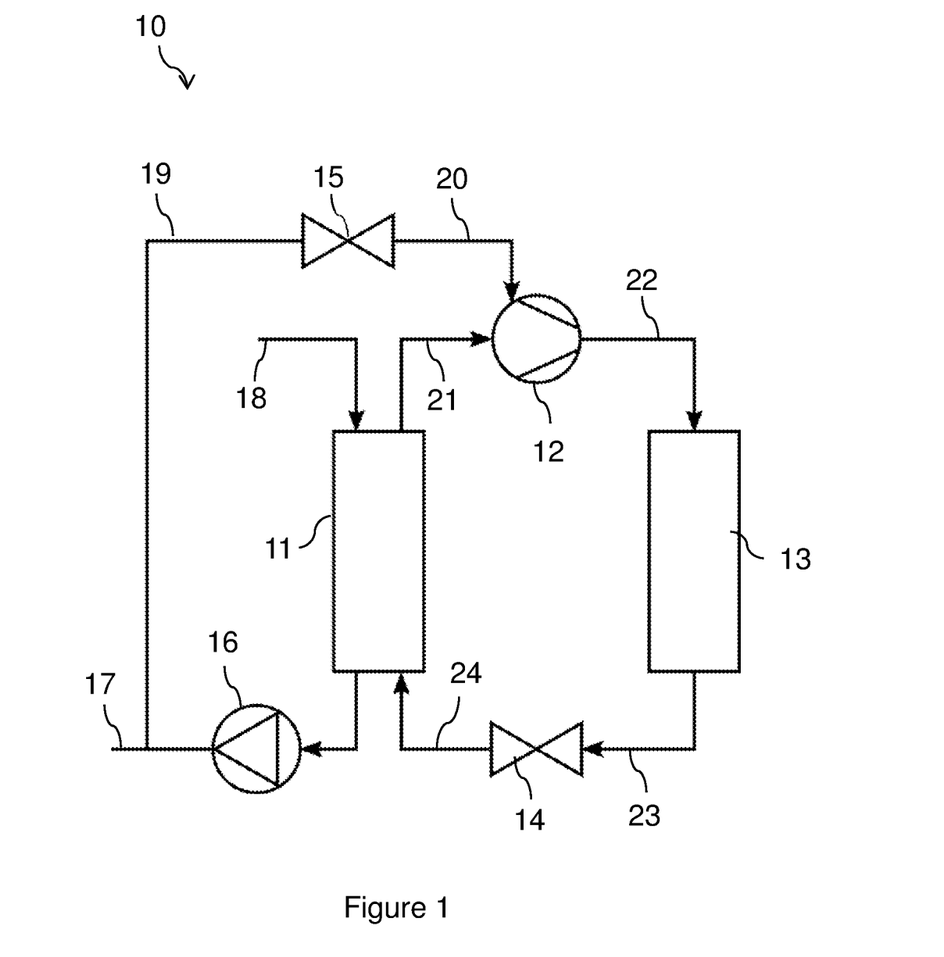
FIG. 1 represents, schematically, a thermodynamic cycle using mechanical vapor compression, wherein the cooling fluid is collected from the evaporator circuit.
Figure 2:
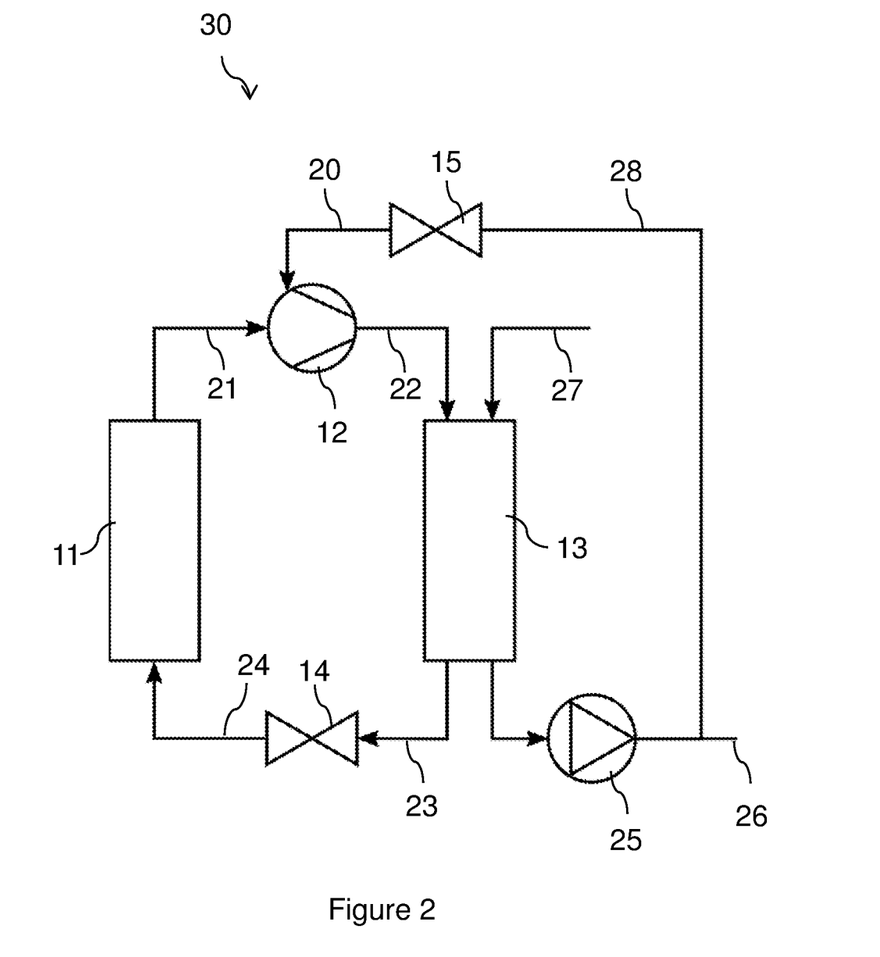
FIG. 2 represents, schematically, a thermodynamic cycle using mechanical vapor compression, wherein the cooling fluid is collected from the condenser circuit.

The invention, and its application to the cooling of a compressor in particular, is in line with a thermodynamic cycle using mechanical vapor compression as presented in FIG. 1 or 2. In the case of water as coolant, the water is the working fluid. This is evaporated at low pressure, this same pressure being defined by the desired evaporation temperature (for example, between 0 and 20° C. for an R718 refrigerant cycle, R718 designating the coolant code for water according to the ANSI/ASHRAE standard 34-1992). The thermodynamic cycle 10 shown in FIG. 1 is derived from a standard mechanical vapor compression cycle, except that the heat-transfer fluid and the coolant are one single entity. In this regard, the person skilled in the art can refer to the description of the patent application published under the number FR3071913.

FIG. 1 shows a compressor 12 that collects the water vapor, which is at a low temperature and comes from an evaporator 11 through a line 21. The outlet pressure of the compressor 12 is defined by the condensation temperature of the water vapor relative to the ambient environment (for example between 50 and 60° C.). The vapours are condensed at the level of a condenser 13 after transfer by a line 22 from the compressor 12. This heat exchanger 13 can be cooled by the ambient air by means of a fan (not shown) or by another liquid or gaseous fluid. After condensation of the water vapor, the liquid water passes through an expansion valve 14, also called a pressure-reducing valve, is transferred via a line 23 from the condenser 13, then returned into the evaporator 11 by the line 24. The heat-transfer fluid in the liquid state in the evaporator 11 is transferred towards a channel 17 connected to the system to be cooled by the circulation pump 16. The heat-transfer fluid having absorbed the calories coming from the system to be cooled is routed in a return line 18 which returns towards the evaporator 11 in liquid-vapor phase. In the case where the cooling liquid of the rotor is collected from the evaporator circuit 11, the circulation pump 16 also has the role of supplying the pressure and flow rate necessary for the system for cooling the rotor of the compressor 12. For this, some of the heat-transfer fluid is diverted thanks to the channel 19 at the outlet from the circulation pump 16. The flow rate of the fluid is controlled by the regulator valve 15 then the liquid is sent to the injection system of the compressor 12 by the channel 20.

A second variant of the cooling circuit 30 for a rotor, in which the cooling liquid is collected directly in the condenser 13, is shown in FIG. 2. In this case, a circulation pump 25 is placed on the circuit of the condenser 13. Some of the flow from the pump 25 is used to provide what is necessary to the system for cooling the rotor of the compressor 12. In the same way as in FIG. 1, a channel 28 collects some of the liquid to send it to the compressor 12 via a channel 20, all being regulated by the valve 15. Most of the flow from the circulation pump 25 is carried in the line 26 to be taken to a condensation unit, that cools the coolant which then returns into the line 27 and allows the hot vapours present in the upper portion of the condenser 13 to be condensed.

Figure 3:
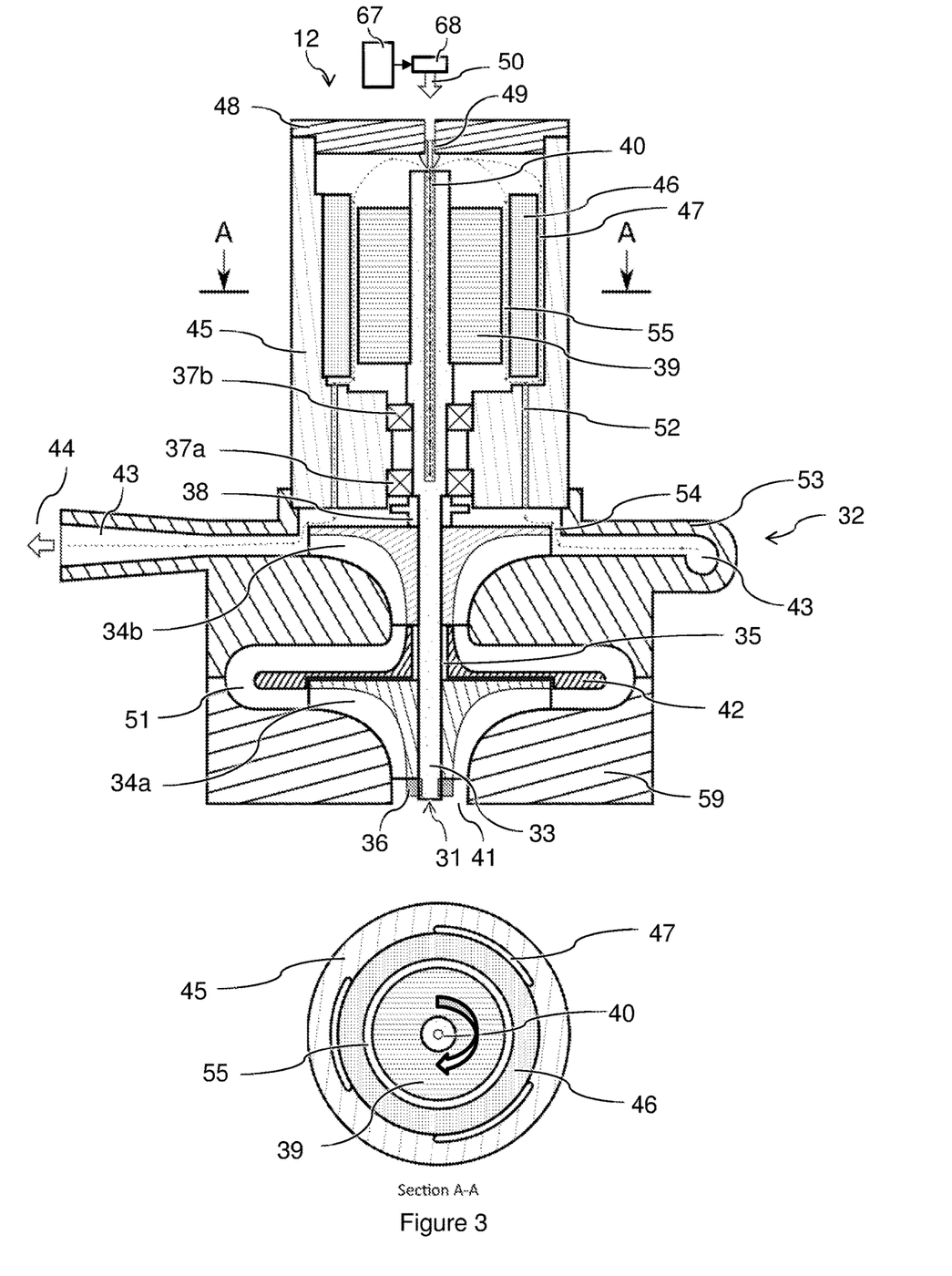
FIG. 3 represents, schematically and according to two cross-sections, a centrifugal compressor with two compression stages, with a passage for vapours through the electric motor.

FIG. 3 shows, at the top, an axial cross-section and, below, a transverse cross-section A-A identified in the top portion. As shown in FIG. 3, the compressor 12 is formed of a rotating rotor 31 and two stator portions comprising the stator envelope 32. The rotating rotor 31 comprises a primary shaft 33 on which different components are mounted and fixed, in particular the electric driving rotor 39, the compression stage(s) 34a and 34b, and the bearing system comprised of ball bearings 37a and 37b, a set of spacers 35 and 38, and a blocking lock-nut 36.

The rotor assembly 31 is divided into three areas, a motor portion, a bearing portion and a compression portion, placed respectively and successively one after another. The compression portion can comprise one or more compression stages, two stages being shown in FIG. 3 in the form of centrifugal wheels 34a and 34b. The compression technology known as centrifugal has been adopted because it makes it possible to obtain significant compression ratios and volume flow rates in a reduced space, these characteristics being especially desirable when water is used as a coolant at low evaporation temperatures. The centrifugal wheels 34a and 34b are made of a light material resistant to the mechanical stress, such as aluminium, or titanium, alloys. The compression stages 34a and 34b are mounted one after another, which has the advantage of obtaining a compact compressor while limiting the load losses in an interstage diffuser 51.

Positioning the electric rotor 39 and the compression stages 34a and 34b on either side of the bearing area 37a and 37b results in a rotor 31 with a double balanced cantilever, and uniform and centralized thermal management of the bearing area. The primary shaft 33 is produced in a hard, rigid material such as steel or carbon fibre. All the elements assembled on the primary shaft 33 are installed so as to enable the mechanical torque to be transmitted through each element required, while ensuring that this same torque is transmitted despite the thermal expansions appearing during the operation and temperature rise of the compressor 12, up to its nominal operating point, and taking into account expansions linked to the centrifugation of the components. Various techniques can be used for installing the parts on the primary shaft 33, such as cold heat shrinkage, hot heat shrinkage, the combination of both thermal shrinkage methods, or press fitting.

The mechanical torque is provided by the electric driving rotor 39. This rotor operates, in combination with an electric stator 46, thanks to an electric current with variable magnitude and frequency being injected at its terminals. There are several electric motor technologies including, in a non-limiting way, asynchronous motors, permanent magnet synchronous motors, and variable reluctance synchronous motors. The electric driving rotor 39 is fixed on the primary shaft 33 so as to allow torque transmission at nominal operation, taking into account the thermal expansions and the deformations linked to the centrifugation of the rotor. The primary shaft 33 comprises an open cavity 40 that runs the length of the electric rotor 39 and preferably extends to the bearing area where the ball bearings 37a and 37b are located. An injection nozzle 49, or injector, from which comes the cooling liquid 50 from the channel 20, is placed opposite this cavity 40.

The open cavity 40 has a single opening opening out around the axis of rotation of the rotor. Thus the single opening in the cavity 40 simultaneously forms the inlet for the cooling liquid injected by the injector 49 and the discharge for the cooling fluid leaving the cavity in the form of vapor.

The central portion of the primary shaft 33 comprises a cylindrical seat on which at least the two ball bearings 37a and 37b are placed. These ball bearings 37a and 37b are suited to rotating at high rotation speeds, for example above 50,000 rpm. These consist of opposed-mounting angular contact ball bearings. The inner and outer rings are made of hardened steel, resistant to corrosion, while the bearings are made of steel, or ceramic. The bearing cage is made of a material resistant to the temperature at which the bearing operates. The bearings 37a and 37b are mounted on the primary shaft 33 with a tightening play that makes it possible to keep the bearing cage fixed despite the centrifugal forces and the thermal expansions in nominal operation.

The so-called "back-to-back" assembly configuration of bearings 37a and 37b makes it possible to increase the centre-to-centre distance equivalent to the pivoting link formed by the two bearings. Note that at least two bearings are needed to satisfy the pivoting link condition. The elements in contact with the bearings 37a and 37b, i.e. the bearing bore of the motor casing 45 and the bearing seating of the primary shaft 33, have a hardness equivalent to the material of the bearing rings. It is possible to mount a combination of asymmetric bearings, where the number of bearings placed in contact with the spacer 38 is different from the number of bearings placed in contact with the shoulder of the primary shaft 33 close to the electric driving rotor 39.

The compression stage 34a is mounted on long hub on the primary shaft 33 and stopped axially by the shoulder of the spacer 38. The spacer 38 is mounted tightly on the primary shaft 33 and blocked axially on one side by a shoulder of the primary shaft 33. The compression stage 34a is held in position by the tightening interference of its bore on the cylindrical seating of the primary shaft 33. The spacer 35 is positioned and mounted tightly on long hub on the primary shaft 33. The spacer 35 is made from a similar material to that of the compression stages 34 or primary shaft 33. The spacer 35 is stopped axially on the primary shaft 33 up to the compression stage 34b.

Then, the compression stage 34b located at the end of the primary shaft 33 is mounted by a long hub. Its material and mounting characteristics are similar to those of the compression stage 34a. The geometric dimensions of the compression stages 34a and 34b can be different, especially for the shape of the blades, the boring diameter, the hub width, the input and output diameters of the wheels. The compression stage 34a also has its own interference play ensuring that the part is held and the torque is transmitted to the primary shaft 33 taking centrifugation and thermal expansions into account. The blocking lock-nut 36 is then fixed on the primary shaft 33. The nut 36 has a dual role, firstly to keep in place the compression stages 34a and 34b and the spacer 35 in the same axial position, and secondly to provide a correction plane during the balancing phase of rotor 31. In effect, the manufacturing and installation tolerances do not allow the axis of inertia of the rotor assembly 31 to coincide with its axis of rotation. Thus a residual imbalance is produced that needs to be minimized, failing which strong vibrations and radial forces are generated on the ball bearings 37a and 37b that can result in their premature degradation. The blocking lock-nut 36 is screwed on the primary shaft 33 and rotatably locked thanks to the friction torque of its shoulder surface with the compression stage 34a. This part is made from a similar material to that of the primary shaft 33.

The stator envelope 32 comprises all the elements that encompass the rotor 31 and provide four major functions:
  enable the rotation of the rotor assembly 31;
  direct the fluid to be compressed between the compression stages 34a and 34b;
  connect the compressor 12 to the outlet from the compressor 11 and to the inlet of the condenser 13; and
  ensure the tightness of the rotor 31 with regard to the exterior.

The envelope 32 of the compressor 12 comprises a compressor casing 59, the interstage diffuser 51, an interstage rectifier 42 and a volute 53. The compressor casing 59 is connected directly to the evaporator 11 via the sealed line 21 (see FIGS. 1 and 2). The casing 59 is made of a material, or comprises a covering, that is resistant to water vapor and to the corrosion phenomenon. This casing 59 also has one portion that adopts the shape of each compression stage. Play not exceeding a few tenths of a millimetre is left between the stator part 53 and the compression stage 34a so as to allow sufficient clearance of the rotor assembly 31 when the compressor 12 is set in rotation, and during critical speed shifts. The rotation of the first compression stage 34a draws in and expels the gas by means of the blades, which direct them radially outwards by centrifugation. The work provided converts the kinetic energy of the gas into static pressure, which results in compressing the gas at the outlet from the centrifugal wheel. The compressed vapours then circulate in the diffuser 51 and pass by the interstage rectifier 42 to reach the inlet of the next compression stage 34b.

Dynamic sealing is achieved with the spacer 35 to prevent a back flow of gases to the inlet of the compressor 12. After being compressed once, the vapours then enter the second compression stage 34b where they are compressed again. On output from the compression stage 34b, the compressed vapours are conveyed in the volute 53 that directs them to an outlet 44 of the compressor 12, which is sealingly connected to the condenser 13 by the line 22 (see FIGS. 1 and 2).

There is a radial play or gap 54 between the volute 53, which is fixed relative to the rotor assembly 31, and the compression stage 34b. This play 54 makes it possible to ensure an absence of contact between the rotor 31 and the stator 32 during the transitional phases when a radial clearance can appear, in particular in critical speed shifts of the rotor 31 in flexible regime. The casing 59 and the volute 53 are fixed together so as to ensure a seal to the void between the interior of the compressor, placed under vacuum, and the exterior, at atmospheric pressure or equivalent. In the same way, the volute 53 is sealingly connected to the motor casing 45. The parts of the casing 45 are positioned by mountings of the short hub with shoulder type to ensure a coaxiality error of less than 0.1 mm over all revolving parts.

The motor casing 45 incorporates the angular contact ball bearings 37a and 37b of the bearing of the rotor 31 and also the electric stator 46 that drives the electric driving rotor 39. There is a play of a few tenths called the air gap 55 between the electric rotor 39 and the electric stator 46. This play 55 prevents any contact between the two electric circuits. The compressor 12 also comprises a motor flange 48 that ensures the impermeability of the compressor 12 with regard to the exterior, and also incorporates the system injecting the cooling liquid 50 of the rotor 31. All the parts comprising the stator, in particular the compressor casing 59, the volute 53, the motor casing 45 and the motor flange 48, are, as far as possible, made of the same material, which is light and has a corrosion-resistant covering.

Figure 5:
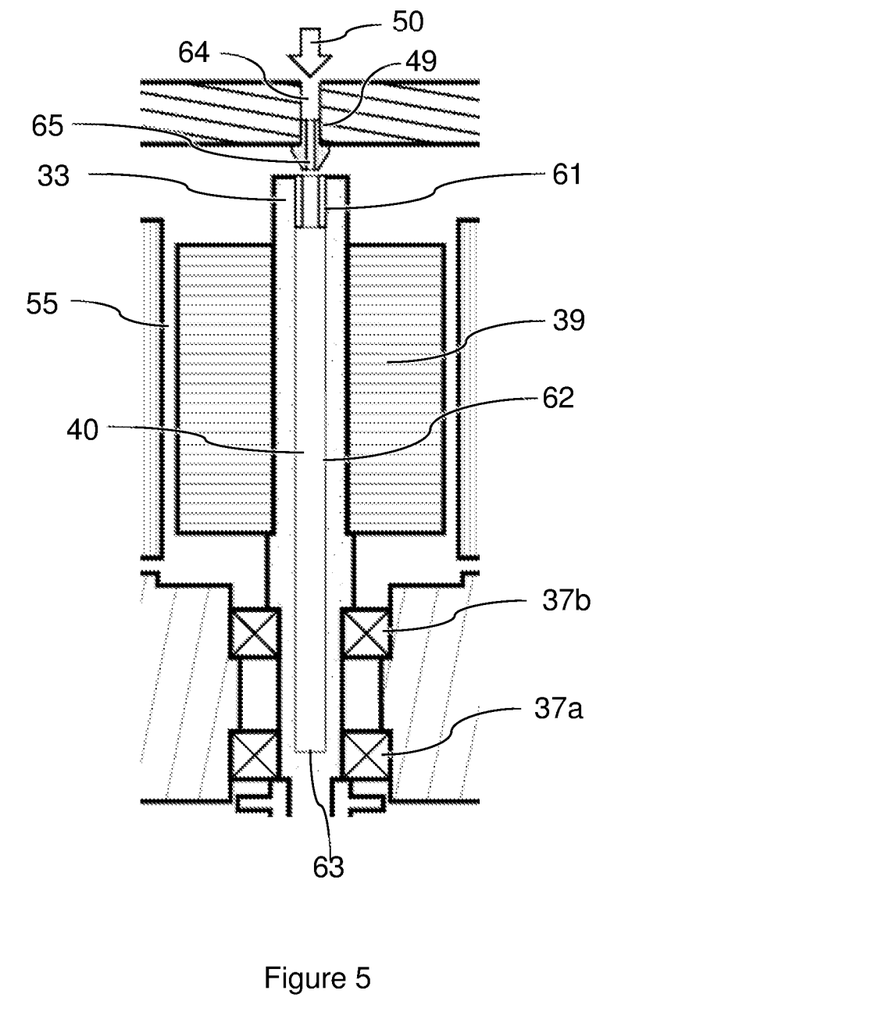
FIG. 5 represents, schematically and in cross-section, a portion of the compressor shown in FIG. 3.

The system for cooling the rotor 31 of the compressor comprises an inlet of the cooling liquid 50 and an injection nozzle 49 as presented in FIG. 5. The cooling liquid 50, water for example, is collected from the circuit of the evaporator 11 or the circuit of the condenser 13 and brought to a pressure at least 0.5 bar higher than the pressure of the circuit it was collected from, thanks to the circulation pump 16 or 25. Before reaching the inlet connector, the flow rate of the liquid is regulated through the valve 15. The flow rate can be controlled in several ways—proportional flow regulation or binary ON/OFF regulation. In the latter case, the flow rate is averaged over the opening and closing cycle of the valve 15. The value of the flow rate for the cooling liquid to be injected into the rotor 31 is determined using a law based on a model of the heat losses present on the electric rotor 39 by the presence of iron losses, rotor losses and ball bearings because of the friction of the bearings on the bearing rings. The flow rate is adjusted as a function of the operating conditions of the compressor 12. Some physical and electrical parameters, such as the power consumed by the motor, the rotation speed of the compressor or the temperature of the components, make it possible to determine the quantity of liquid 50 to be injected to cool the rotor 31.

The cooling device comprises a control unit 67 of the injector 49 that controls the injection of liquid by the injector as a function of the temperature of the rotor. The control unit 67 is, for example, a controller connected to inputs for operating parameter values of the rotating machine, this controller operating according to the instructions of a program. This controller controls a valve 68, for example a solenoid valve, upstream of the injector 49 on a supply circuit (not shown) of the pressurized liquid injector 49.

Preferably, the control unit 67 of the injector 49 is configured to control the injection of liquid by the injector 49 such that the temperature of the rotor causes the evaporation of the liquid in the form of dry vapor.

Preferably, the control unit 67 of the injector 49 controls the injection of liquid by the injector 49 when the temperature of the rotor is higher than a predefined limit value, itself higher than or equal to the evaporation temperature of the injected liquid.

Preferably, the temperature of the rotating rotor 31 is determined by a model utilizing at least one value measured by at least one sensor (not shown) amongst:
- a temperature sensor for the temperature of the stator 32 or 46 of the rotating machine 12;
- a current sensor for the current supplied by a variator (not shown) powering an electric motor (not shown) setting the rotor 31 in rotation;
- a pressure sensor for the internal pressure of the rotating machine 12;
- a temperature sensor for the temperature of a cooling liquid of the stator 32 or 46 of the rotating machine 12;
- a temperature sensor for the temperature of the rotor 31; and
- a speed sensor for the rotation speed of the rotor 31.

Preferably, the model utilizes a quantity of liquid injected by the injector 49 to take into account the cooling obtained by the injection of the liquid.

Preferably, the control unit 67 is configured such that the quantity of liquid injected by the injector 49 is an increasing function of the temperature of the rotor 31.

Preferably, the control unit 67 determines the quantity of liquid injected by the injector 49 so that the sum of the quantity of heat absorbed by the heating, up to its phase change temperature, of the injected liquid and of the quantity of heat absorbed by the phase change of the injected liquid, on one side, is greater than 90% (preferably 95%) of the maximum amount of heat the rotor 31 can transmit, at the temperature of the rotor 31, to the liquid through the surface of the cavity 40, on the other side.

Figure 8:
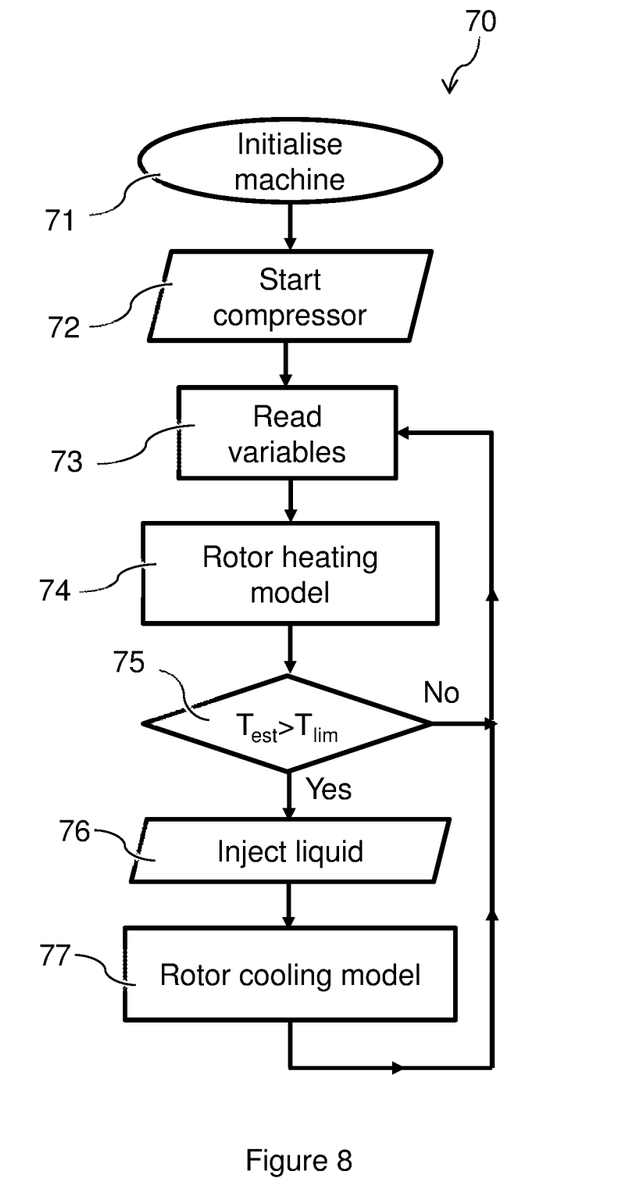
FIG. 8 represents, in the form of a logic diagram, steps in an operating mode of the system injecting liquid into the cavity of the rotor.

A preferred operating mode 70 of the control unit 67 and the injector 49 is shown in FIG. 8.

The injection of liquid into the rotor is defined according to a procedure 70 implemented in a program of a controller of the machine 12. The triggering of the injection of liquid into the cavity 40 is based on a predictive model of the thermal behaviour of the rotor implemented by a program of the machine's controller. This model is split into two portions, the first portion characterizing the heating phenomenon of the rotor during operation, the second portion characterizing the cooling phenomenon of the rotor when an injection is made. This model is produced with theoretical calculations and/or machine tests and/or by automatic learning.

The thermal behaviour model of the rotor is supplied by measurable or predicted values of physical parameters such as the temperature of the stator motor, the current supplied by the variator powering the electric motor, the internal pressure of the compressor, the temperature of the cooling liquid of the stator, the estimated temperature of the rotor and/or the rotation speed of the rotor. The model is also supplied by the characteristics of the rotor such as the mass, the dimensions of the cooling cavity, the electrical specifications of the rotor and the characteristics of the injection of cooling liquid.

During an initialization step 71, the state of the compressor is analysed, and the data relating to the technical characteristics of the compressor are collected. The operation enters an iterative loop as soon as the compressor is started up, during a step 72. The values of physical parameters are determined during a step 73, by means of sensors or estimators of the temperature of the stator, of the current supplied by the variator, of the internal pressure of the compressor, of the temperature of a cooling liquid of the stator, of the estimated temperature of the rotor and/or of the rotation speed of the rotor.

This step 73 is performed at the beginning of the iterative loop. The useful parameter values are then integrated into the thermal behaviour model of the rotor linked during a step 74 to estimate the temperature of the rotor, designated $T_{est}$. A conditional test is performed during a step 75. This test aims to determine whether the temperature conditions are met in order to inject the cooling liquid into the cavity of the rotor, this liquid vaporizing to provide the dry vapor. During the test 75, one determines whether $T_{est} > T_{lim}$, where $T_{est}$ represents the estimation of the rotor temperature based on the predictive model of the thermal behaviour calculated in step 74, $T_{lim}$ is a limit value set theoretically or empirically. If the test is negative, one goes back to step 73 where the updated data is again retrieved in order to re-assess the temperature of the rotor $T_{est}$. Otherwise, if the test is positive, then a step 76 of injecting liquid in the cavity of the rotor is performed. Preferably, the quantity of liquid injected depends on the temperature of the rotor and is an increasing function of this temperature. In this way, the quantity of heat that the rotor is able to transmit to the liquid through the surface of the cavity is taken into account.

This injection leads to a new estimation of the temperature of the rotor, which is calculated based on the rotor cooling model during a step 77. Then one goes back to the start of the iterative loop, at step 73.

The injection system is shown in FIG. 5. The cooling liquid arrives under pressure via the channel 20 in the motor flange 48 in which a channel 64 is produced to allow the liquid 50 to enter the injection nozzle 49. This injection nozzle 49 has a channel 65 and a small aperture designed to deliver a calibrated straight jet, with a constant flow rate for the level of pressure provided by the circulation pump 16 or 25. On output from the injection nozzle 49, a straight liquid jet is sent into the cavity 40 of the primary shaft 33. This cavity is shown as a cylindrical shape in FIG. 3. This cavity 40, preferably cylindrical, is centred on the axis of rotation of the primary shaft 33. The wall 62 of the cavity 40 is rectilinear, for example a cylinder whose directrix is circular, and parallel to the axis of rotation of the rotor assembly 31. The bottom 63 of the cavity 40 is shown flat, but can take any other shape. The injection nozzle 49 is also cantered on the axis of rotation of the rotor assembly 31 such that the liquid jet 50 meets the bottom of the cavity 63 on the axis of rotation, at the place where the tangential speed of the primary shaft 33 is zero. The cooling liquid 50 gradually fills the cavity 40. The regulation system associated with the valve 15 assumes that the temperature of the wall 62 of the cavity 40 of the primary shaft 33 is higher than the temperature of the cooling liquid passing through the nozzle 49. It is also defined that, at the time the valve 15 is opened, the temperature of the wall 62 is higher than the evaporation temperature of the cooling liquid 50 at the operating pressure of the condenser 13. Therefore, the cooling liquid 50 evaporates on contact with the wall 62 of the cavity 40.

The cooling liquid 50 contained in the rotating cavity 40 of the primary shaft 33 has a paraboloidal surface whose shape depends on the rotation speed of the rotor 31 and the inner diameter of the cavity 40. Above a certain rotation speed, the liquid 50 can be ejected from the cavity 40 by centrifugal effect. This phenomenon can propel drops of liquid at high speed outside the rotor 33, which can cause premature wear on the walls receiving the impact of these drops. Moreover, the ejection of the liquid 50 limits the evaporative cooling performance since a fraction of the injected liquid 50 is evaporated, the rest remaining dispersed in the motor casing 45.

Preferably, the cavity 40 is configured to retain the liquid injected by the injector 49, by the effect of gravity or by the effect of having the cross-section of the opening of the cavity 40, perpendicular to the axis of rotation of the rotor, smaller than the cross-section of at least one other portion of the cavity 40.

Figure 6:
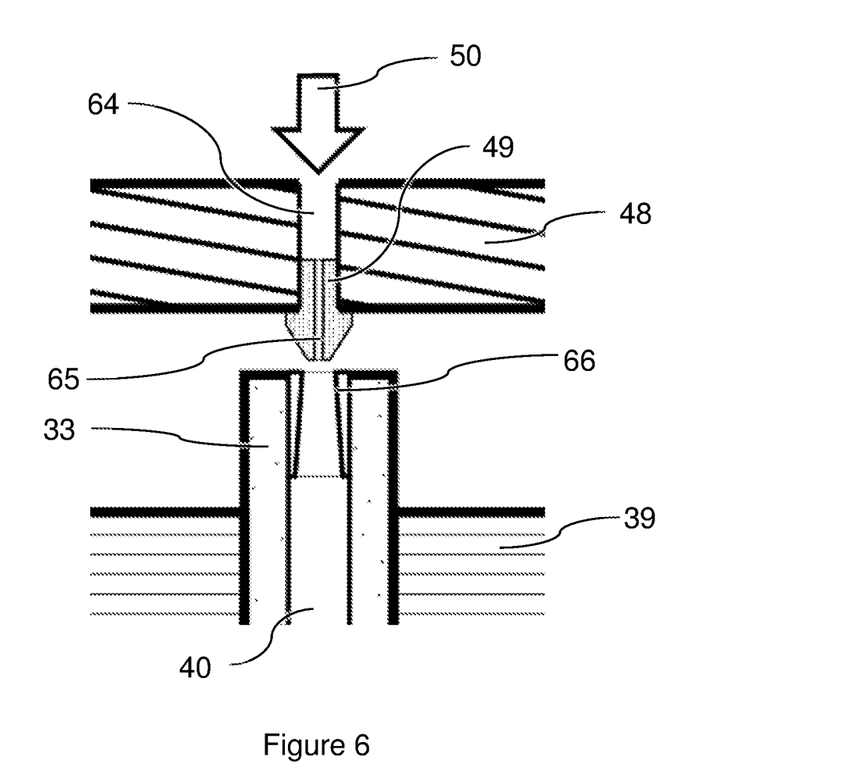
FIG. 6 represents, schematically and in cross-section, an injection inlet with a tapered restriction.
Figure 7:
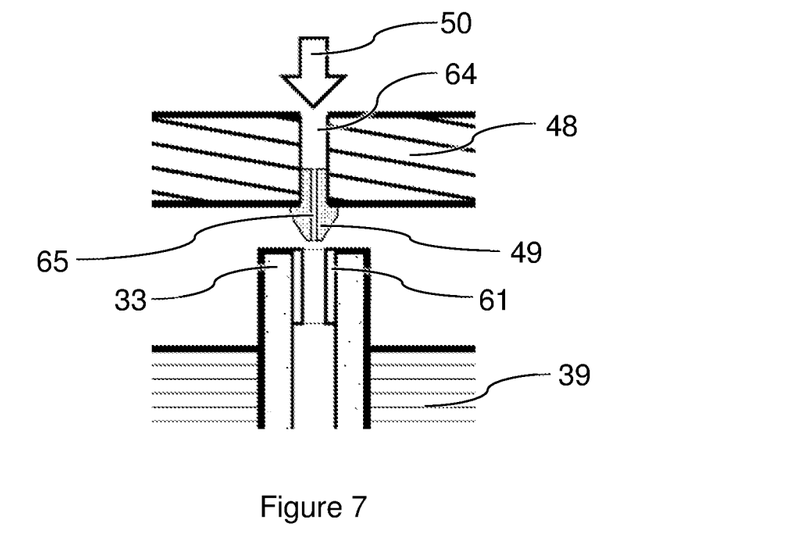
FIG. 7 represents, schematically and in cross-section, an injection inlet with a straight restriction.

To retain the cooling liquid 50 in the cavity 40 while its temperature rises up to the evaporation point, a restriction 61 or 66 (see FIGS. 6 and 7) is placed at the entrance to the opening of the cavity 40. The dimensions of the restriction 61 or 66 are calculated to allow the passage of a liquid jet and a release of vapor through the same cross-section. It is possible to produce a rectilinear restriction 61 as shown in FIGS. 5 and 7, or a tapered restriction 66 in the form of a cone as shown in FIG. 6. The conical tapered restriction 66 makes it possible to limit the mechanical forces of the liquid 50 centrifuged on the restriction. More generally, in some embodiments, the opening of the cavity formed in the shaft is partially blocked by a restriction wherein the surface area of the cross-section at the opening of the cavity is smaller than the surface area of the cross-section inside the cavity. This advantage applies equally for a rotor 31 whose axis of rotation is vertical, oblique or horizontal.

In nominal operation, and before the injection of a cooling liquid 50, the pressure in the motor casing 45 is equivalent to the highest pressure of the compressor 12, i.e. the pressure on output from the compression stage 34b that is conveyed towards the condenser 13. Once the cooling liquid 50 has evaporated, it expands in the enclosure formed by the motor casing 45. Each volume of liquid 50 evaporated increases the vapor pressure in this space. The vapours are therefore evacuated towards areas of lower pressure, in this case the pressure on output from the compression stage 34a. Consequently, the pressure in the motor casing 45 is higher than that in the condenser 13. The vapours thus have two circulation paths to reach the outlet vein 43 of the compressor 12.

The first path goes by the air gap 55, between the electric stator 46 and the electric driving rotor 39. However, the area of passage is insufficient with regard to significant volume flow rates of gas produced by evaporation of the cooling liquid that makes it possible to extract calories from the rotor. A second path goes through the electric stator 46 comprises channels 47 produced between the motor casing 45 and the electric stator 46 also makes it possible to cool the electric stator 46 during the passage of vapours in contact with the surface of the electric stator 46. When the two paths meet on the other side of the electric stator 46, near the bearings 37a and 37b, the vapours pass through at least one channel 52 in the motor casing 45 on the edge of the seating of the motor casing 45 incorporating the ball bearings 37a and 37b. The total cross-section of these channels 52 is equivalent to the area of passage of the air gap 55 and channels 47 of passage through the electric stator 46. The vapours, located at the back of the compression stage 34b, then pass into the duct of the outlet vein 43 through the gap 54, defined as the play between the diameter of the outlet of the compression stage 34b and the boring diameter of the volute 53. The vapours of the cooling liquid exit at lower temperatures than the vapours coming from the compression stage 34a, which has the effect of reducing the overall temperature of the gas mixture in the outlet vein 43 and reducing the dimensions of the condenser. FIG. 3 shows three channels 47 of passage through the electric rotor 46. Of course, the number of such channels can be greater or less than three.

Figure 4:
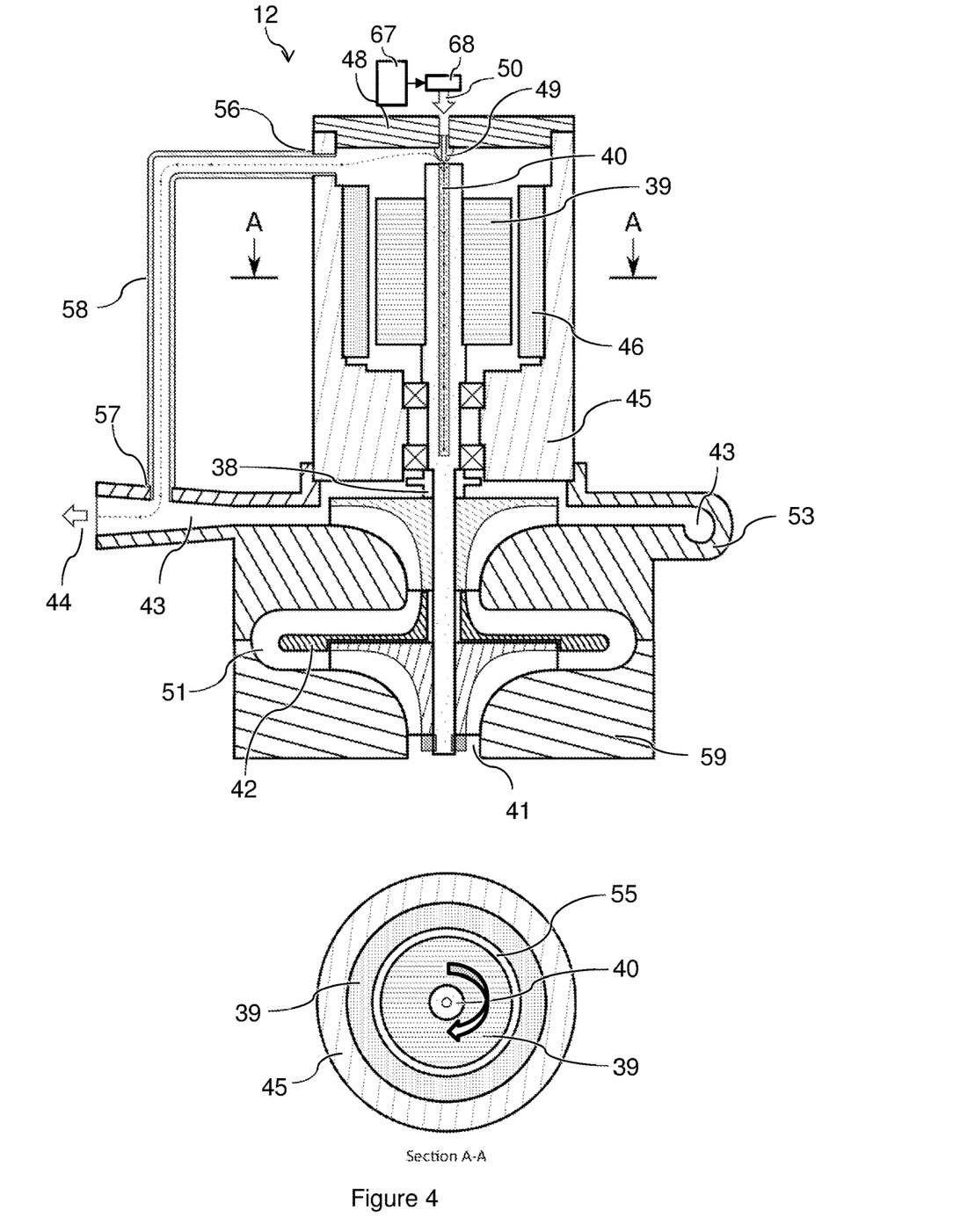
FIG. 4 represents, schematically and according to two cross-sections, a centrifugal compressor with two compression stages, with a passage for vapours via a radial outlet of the motor casing.

FIG. 4 shows an alternative output configuration for the cooling vapours. FIG. 4 shows, at the top, an axial cross-section and, below, a transverse cross-section A-A identified in the top portion. With regard to the configuration shown in FIG. 3, instead of having the cooling liquid pass in the channels between the electric stator 46 and the electric driving rotor 39, in the channels 47 and through the gap 54, these vapours are evacuated directly to the outlet vein 43 by means of an outlet tap 56 made in the motor casing 45, and an inlet tap 57 made in the volute 53. A line 58 provides the connection between the two taps sealingly.

The invention claimed is:

1. Device for cooling a rotor of a rotating machine, characterized in that it comprises:
   in a rotor assembly comprising the rotor and rotating with the rotor, at least one open cavity having a single opening opening out around the axis of rotation of the rotor, and
   facing the single opening in the cavity, a cooling-liquid injector;
   the single opening in the cavity simultaneously forming the inlet for the cooling liquid injected by the injector and the discharge for the cooling fluid leaving the cavity in the form of vapor.

2. Device according to claim 1, which comprises a control unit of the injector configured to control the injection of liquid by the injector as a function of the temperature of the rotor.

3. Device according to claim 2, wherein the control unit of the injector is configured to control the injection of liquid by the injector such that the temperature of the rotor causes the evaporation of the liquid in the form of dry vapor.

4. Device according to claim 2, wherein the control unit of the injector controls the injection of liquid by the injector when the temperature of the rotor is higher than a predefined limit value.

5. Device according to claim 4, wherein the temperature of the rotor is determined by a model utilizing at least one value measured by at least one sensor amongst:
  a temperature sensor for the temperature of a stator of the rotating machine;
  a current sensor for the current supplied by a variator powering an electric motor setting the rotor in rotation;
  a pressure sensor for the internal pressure of the rotating machine;
  a temperature sensor for the temperature of a cooling liquid of the stator of the rotating machine;
  a temperature sensor for the temperature of the rotor; and
  a speed sensor for the rotation speed of the rotor.

6. Device according to claim 5, wherein the model utilizes a quantity of liquid injected by the injector.

7. Device according to claim 4, wherein the control unit is configured such that the quantity of liquid injected by the injector is an increasing function of the temperature of the rotor.

8. Device according to claim 4, wherein the control unit is configured such that the quantity of liquid injected by the injector makes the sum of the quantity of heat absorbed by the heating, up to its phase change temperature, of the injected liquid and of the quantity of heat absorbed by the phase change of the injected liquid, on one side, greater than 90% of the maximum amount of heat the rotor can transmit, at the temperature of the rotor, to the liquid through the surface of the cavity, on the other side.

9. Device according to claim 1, wherein the rotor assembly comprises a shaft and an electric rotor surrounded by an electric stator, the cavity being formed, at least, in the shaft.

10. Device according to claim 9, wherein the cavity formed in the shaft extends over the entire length of the electric rotor up to at least one bearing.

11. Device according to claim 9, wherein the electric stator is traversed, parallel to the axis of rotation of the rotor, by at least one channel configured to convey at least some of the vapor obtained by evaporation of the cooling liquid in the cavity of the shaft.

12. Device according to claim 9, wherein the air gap between the electric rotor and the electric stator is configured to convey at least some of the vapor obtained by evaporation of the cooling liquid in the cavity of the shaft.

13. Device according to claim 1, wherein the cavity is configured to retain the liquid injected by the injector.

14. Device according to claim 1, wherein the opening of the cavity formed in the shaft is partially blocked by a restriction wherein the surface area of the cross-section at the opening of the cavity is smaller than the surface area of the cross-section inside the cavity.

15. Device according to claim 1, wherein the rotor has an axis of rotation substantially vertical and the open cavity formed in the shaft is oriented upwards.

16. Device according to claim 1, wherein the cooling fluid is water.

17. Rotating machine comprising a compressor and a cooling device according to claim 1, the cooling fluid being the same fluid as the working fluid compressed by the compressor.

18. Machine according to claim 17, wherein a channel is formed in a motor casing to convey at least some of the vapor obtained by evaporation of the cooling liquid in the cavity of the shaft, and a gap is formed between a volute (53) and the last stage of the compressor, this gap being configured to convey this portion of the vapor.

* * * * *